United States Patent

[11] 3,631,316

[72] Inventor Hans A. Eckhardt
 55 Crescent Bend, Allendale, N.J. 07401
[21] Appl. No. 804,235
[22] Filed Mar. 4, 1969
[45] Patented Dec. 28, 1971

[54] SYSTEM FOR LIGHTING A PARKED VEHICLE
 4 Claims, 2 Drawing Figs.
[52] U.S. Cl. .................................................. 315/83,
 315/77, 340/74
[51] Int. Cl. ................................................ B60q 1/48
[50] Field of Search ............................................ 315/77, 80,
 82, 83, 84; 340/74, 76, 81, 95, 102, 143; 200/5,
 20, 24, 26, 51.05, 51.06, 156, 168; 338/132, 134,
 191, 198, 200

[56] References Cited
 UNITED STATES PATENTS

| 2,211,706 | 8/1940 | Schellenger | 338/134 X |
| 2,341,750 | 2/1944 | Williams et al. | 338/198 X |
| 2,716,874 | 9/1955 | Wiley | 338/198 X |
| 2,717,988 | 9/1955 | Myers | 315/82 X |
| 2,897,479 | 7/1959 | Keegin | 340/76 X |
| 2,942,221 | 6/1960 | Di Girolamo | 338/200 |
| 2,948,832 | 8/1960 | Hollins | 315/82 |
| 3,267,426 | 8/1966 | Parkes | 315/83 X |
| 3,375,446 | 3/1968 | Guyton | 338/198 X |

FOREIGN PATENTS

| 1,076,778 | 1/1966 | Great Britain | 315/82 |
| 1,186,761 | 2/1965 | Germany | 315/83 |

*Primary Examiner*—Roy Lake
*Assistant Examiner*—E. R. La Roche

ABSTRACT: For lighting a vehicle during periods of parking, the vehicle has a first circuit from a battery through an adjustable resistance and a warning switch coupled to the vehicle's light control, alternately to the vehicle's tail side and parking lights. A second circuit leads from the battery through the light control separately to the tail side and parking lights. In a warning position of the light control, the first circuit becomes functional and the lights can be turned on and off alternately by turning the warning switch, the brightness being adjusted by turning the light control's outer ring which is coupled with the adjustable resistance. The warning switch closes the first circuit alternately to tail side or parking lights and simultaneously to individual control lights which are correspondingly positioned in a scaled-down symbol of the car.

PATENTED DEC 28 1971　　　　　　　　　　　3,631,316

INVENTOR.
H. A. ECKHARDT
BY
George B. Oujevolk
ATTORNEY

SYSTEM FOR LIGHTING A PARKED VEHICLE

The present invention relates to the field of lighting a vehicle and more particularly to an electric lighting system for a motor vehicle during extended periods of parking.

Generally, a motor vehicle has tail, side and parking lights and a light control adjustable to a so-called parking position in which these lights are energized. However these lights are usually not used during periods of parking because the energy consumption by these tail, side and parking lights is so high that the battery will be exhausted within a relatively short time. This situation has not improved during the last years and even decades when the wattage and number of these tail, side and parking lights has been increased, primarily for reasons of better visibility of the vehicle while moving in traffic. As a result, the designation parking lights has become a misnomer for lights not used and not to be used while parking for an appreciable time.

The need for one or more lights positioned at exposed areas of the vehicle has long been recognized, and in many countries, especially in Europe, the laws have always required a vehicle to be illuminated when parked on a street, road or any public thoroughfare, even if the period of parking extended all through the night. Since the increasingly high wattage of the tail, side and parking lights prohibited their use for compliance with the law during longer periods of parking, one resorted to usually two extra warning lights, one at each side of the vehicle, for which the car body had to be cut out on two locations, two special light assemblies had to be inserted and fastened to the car body, and extra electric connections had to be wired within the car frame from the fuse box through an especially provided multiposition switch to the two warning lights at opposite sides of the car.

Frequently these warning lights turned out to be inadequate, especially in foggy or misty weather, when the car's owner wished he had just one warning light of higher wattage at suitable location, in order to warn approaching drivers effectively. At the other end of the scale, such warning lights consumed too much energy, particularly for overnight street parking. Aside from the relatively high cost for such installations, most car bodies were decisively marred in their appearance and the overall impression of a passenger car was unfavorably changed by hardware protruding from the body contours.

American-made cars in European and other countries have for many years run into the dilemma of being required by law to have the high wattage tail, side and parking lights, a total of four to eight lights depending upon the car model, turned on even for overnight street parking, and to exhaust the battery. This is one of the reasons which have often decided against the purchase or use of American-made cars abroad.

It is therefore an object of the present invention to provide a lighting system for a parked vehicle which avoids the described disadvantages, and provides tail side and parking lights which can be turned on alternately in accordance with traffic conditions.

It is another object to provide tail side and parking lights which can be adjusted in their energy consumption and brightness according to weather and traffic conditions.

It is a further object to provide for each of the tail side and parking lights an individual control light which indicates whether that particular tail side or parking light is turned on, and if so to which brightness it is adjusted.

It is another object to provide at the car dashboard a scaled-down symbol of the car with control lights positioned correspondingly to the positions of the tail side and parking lights, so that the location of the turned-on lights is indicated.

It is a further object to combine such a control light with an individual light switch into a lighted pushbutton switch located in the car symbol, so that a tail side or parking light is turned on by pressing its correspondingly positioned pushbutton switch which then lights up, and is turned off by again pressing that pushbutton switch which then dims down.

It is another object to provide a car's light control with an extra axial position wherein the tail side and parking lights can be turned on alternately.

It is a further object to provide a car's light control which, when turned, varies the adjustable resistance and thus the brightness and energy consumption of the turned on lights.

It is another object to reset the tail side and parking lights' individual switches to the closed position and the adjustable resistance to its minimum position by closing the ignition switch or by axial movement of the light control, so that all tail side and parking lights are reset and connected for full brightness when the car is started, or the light control is pushed in or out from the parking position.

These and other objects, advantages, features and uses will be apparent during the course of the following description when taken in connection with the accompanying drawings wherein.

Figure 1:
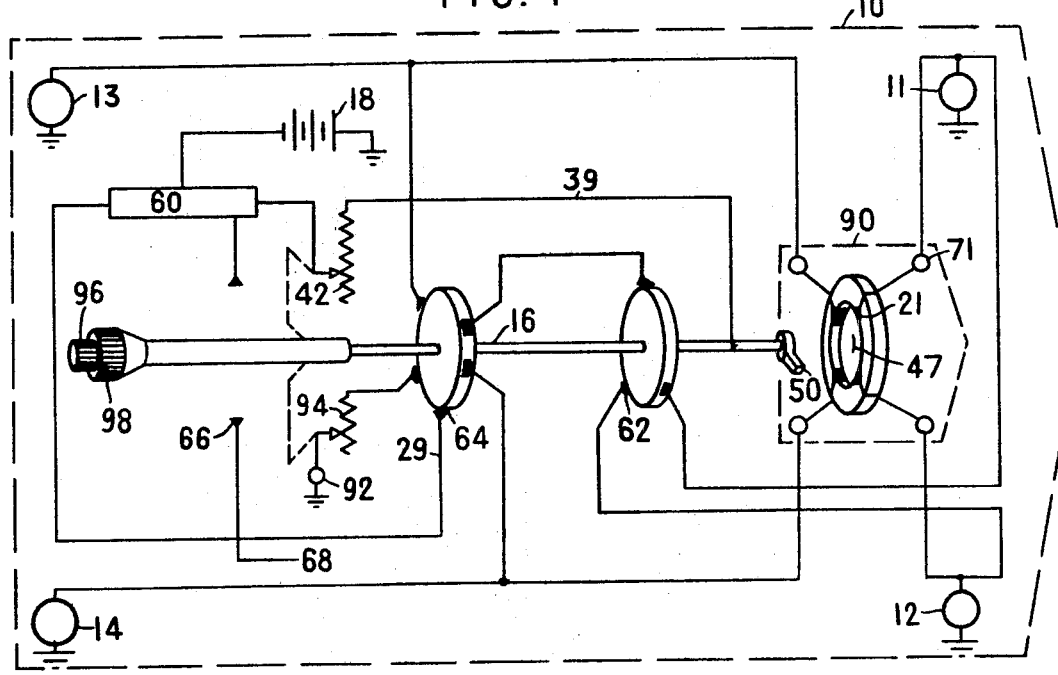
FIG. 1 is a schematic wiring diagram showing one embodiment of the invention.

Referring to the drawings, FIG. 1 shows a system for lighting a parked vehicle 10 with parking lights 11, 12 and tail side lights 13, 14 at the vehicle's circumference. A first circuit 39 connects a battery 18 through a fuse box 60, an adjustable resistance 42 and a warning switch 50 alternately to the lights 11–14 which can be turned on and off alternately by turning the warning switch 50. A second circuit 29 connects the battery 18 through a light control 16 separately to the lights 11–14 which are turned on and off separately by axially operating the light control 16. The warning switch 50 has alternate positions 21 for the lights 11–14, is coupled to the light control 16 and turned by turning the inner knob 96, and is functional in a distinct position of the light control 16, the warning position 47, which is distinct from other lighting positions 62, 64, 66. The adjustable resistance 42 is coupled to the light control 16. In the first circuit 39, individual control lights 71 are provided for the lights 11–14, and they are combined with the alternate positions 21 of the warning switch 50. The control lights 71 are positioned in a scaled-down symbol 90 correspondingly to the positions of the lights 11–14.

The light control 16 has the conventional contact positions 62, 64, 66. In the positions 62–64 of the light control 16, as depicted in FIG. 1, the parking lights 11, 12 and the tail side lights 13, 14 are turned on, while in the positions 64–66 the tail side lights 13, 14 are turned on as well as the headlights (not shown) through the headlight connection 68. Instrument lights 92, of which one is shown, are adjustable through the variable resistance 94 which is varied by turning the outer ring 98 of the light control 16.

In operation, to bring the vehicle 10, shown in FIG. 1 with the parking lights 11, 12 and the tail side lights 13, 14 turned on, into a condition more suitable for a longer period of parking, the light control 16 is pushed axially to the right, thus disconnecting at the contact positions 62–64 the lights 11–14 from the battery 18. At the same time the warning switch 50 gets in the warning position 47 and the driver can now turn on that light of the lights 11–14 which is most desirable for the traffic situation by turning the inner knob 96 of the light control 16. Simultaneously the individual control light 71 of that light is turned on at the corresponding position in the symbol 90 of the vehicle. The energy consumption and brightness of the selected light is varied from a maximum to a minimum and vice versa by adjusting said resistance 42 which is done by turning the outer ring 98 of the light control 16.

By pushing the light control 16 further axially to the right, all lights of the vehicle are turned off, while by pulling it all the way out to the left, into the contact positions 64–66, the head lights (not shown) and the tail side lights 13, 14 are turned on.

Figure 2:
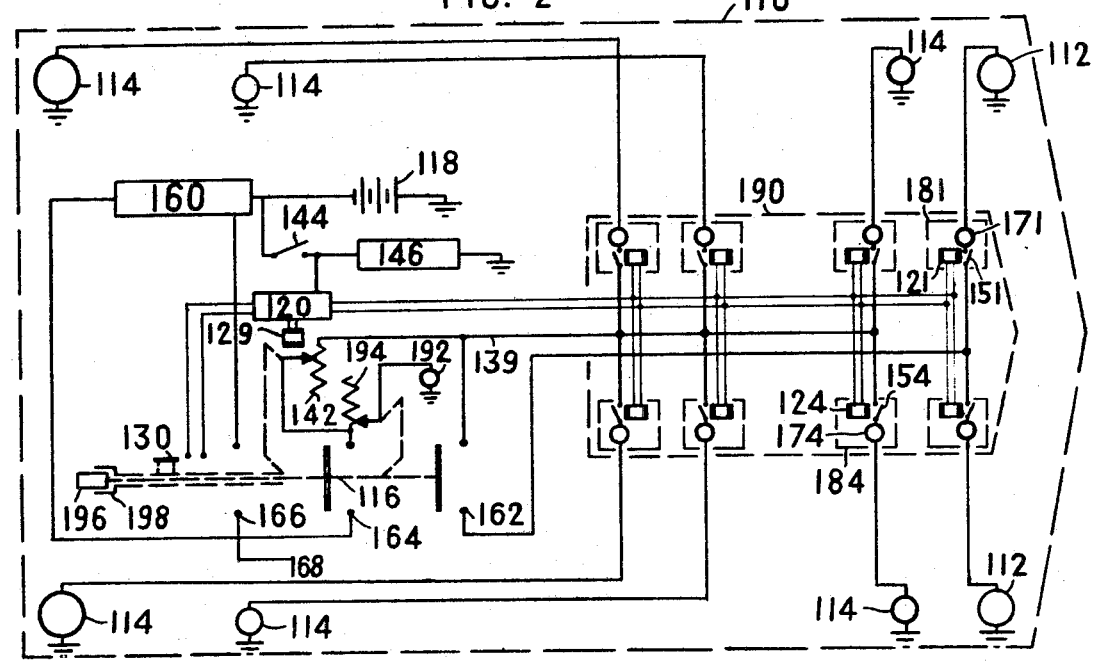
FIG. 2 is a schematic wiring diagram illustrating another embodiment of the invention.

FIG. 2 shows a system for lighted parking of a vehicle 110, which comprises parking lights 112, and tail side lights 114 at the vehicle's periphery. A circuit 139 connects a battery 118 to the lights 112, 114 through a fuse box 160, a light control 116 and warning switches 151, 154. The light control 116 has a first position, the parking position 162–164, wherein the circuit 139 is closed through the warning switches 151, 154 to the parking lights 112 and the tail end lights 114. In a second position, the headlight position 164–166, the circuit 139 is closed through the warning switches 154 to the tail side lights 114.

The individual warning switches 151, 154 are combined with individual control lights 171, 174 into lighted pushbutton switches 181, 184 which are positioned in a scaled-down symbol 190 of the vehicle correspondingly to the positions of the lights 112, 114. The circuit 139 includes an adjustable resistance 142 which is coupled to the light control 116. To reset the resistance 142 to its minimum and the warning switches 151, 154 to their closed position, reset means 120 are provided which comprise the contact movement 130, energizing the relays 121, 134, 129 when the light control 116 is shifted from the parking position 162–164 to a different light control position. Furthermore, the reset means 120 include the ignition switch 144 connected to a starter 146 energizing the relays 121, 134, 129, when the ignition 144 is closed.

In operation, to bring the vehicle 110 into a condition suitable for an extended period of parking, the light control 116 is pushed in the parking position 162–164 thus closing the circuit 139. Lights 112, 114 and their control lights 171, 174 are turned on by closing their warning switches 151, 154 which is done by pressing their pushbutton switches 181, 184 which then light up in the car's symbol 190 on positions corresponding to the positions of the lights 112, 114. The energy consumption and the brightness of the lights 112, 114 and of the control lights 171, 174 are varied by adjusting the resistance 142 which is done by turning the outer ring 198 of the light control 116. When the car is started by closing the ignition switch 144, the relays 121, 124, 129 of the reset means 120 are energized whereby the warning switches 151, 154 are closed and the resistance 142 is adjusted to its minimum, thus returning all lights 112, 114 to full brightness for operation of the car in traffic.

In this specification, other car lights and their circuits, such as directional signal lights, four-way flasher lights, backup lights, license plate lights, have been omitted in order not to confuse the drawings and description. Furthermore, such lights are irrelevant for an understanding of this specification.

Although the present invention has been described in conjunction with particular embodiments, it is apparent to those skilled in the art that modifications and variations may be resorted to without departing from the spirit of the invention. Such modifications and variations are considered to be within the purview and scope of the invention and appended claims.

I claim:

1. System for lighting a vehicle comprising tail side and parking lights at said vehicle's periphery;
   first connection means from an electric energy source to warning switch means having an individual contact for each one of said lights, and each one of said contacts to one of said lights;
   second connection means from said electric energy source to light control means and therefrom individually and separately to said lights;
   said warning switch means extending from and being operable by said light control means in a first position thereof, the warning position;
   said second connection means being completed by said light control means in a second position thereof, the lighting position;
   an adjustable resistance in said first connection means between said electric energy source and said warning switch means;
   an individual control light in said first connection means between each one of said contacts and one of said lights;
   the control lights being positioned in a scaled-down plant view symbol of said vehicle indicating the front end and rear end thereof, correspondingly to the positions of the tail side and parking lights.

2. System for lighting a vehicle comprising
   tail side and parking lights at said vehicle's periphery;
   connection means from an electric energy source to light control means and on to warning switch means of said lights and therefrom individually to said lights;
   said light control means having a first position, the parking position, forming a connection from said electric energy source to the warning switch means of said tail side and parking lights;
   said light control means having a second position, the driving position, forming a connection from said electric energy source to the warning switch means of the tail side lights;
   said warning switch means having an individual warning switch and control light for and connected to each one of said tail side and parking lights;
   said control lights being positioned in a scaled-down plan-view symbol of said vehicle correspondingly to the positions of said tail side and parking lights;
   the connection means between the electric energy source and said warning switch means comprising an adjustable resistance to vary the energy consumption of said tail side and parking lights.

3. System for lighting a vehicle as claimed in claim 2 wherein reset means reset said adjustable resistance to its minimum and said warning switches to their closed positions, said reset means being actuated by moving said light control means from said parking position, causing said tail side lights to resume full energy consumption and brightness with the light control means in the driving position, and causing said tail side and parking lights to resume full energy consumption and brightness by shifting said light control means from and then back to said parking position.

4. System for lighting a vehicle as claimed in claim 2 wherein
   reset means are provided comprising coils resetting, when energized, said adjustable resistance to its minimum and said warning switches to their closed positions, said coils being energized by closing said vehicle's ignition switch, so that all said tail side and parking lights are reset for full energy consumption and brightness, when said vehicle is started.

* * * * *